US010713636B2

(12) United States Patent
Israeli et al.

(10) Patent No.: US 10,713,636 B2
(45) Date of Patent: Jul. 14, 2020

(54) DEFENSE AGAINST CREDIT CARD THEFT FROM POINT-OF-SALE TERMINALS

(71) Applicant: ILLUSIVE NETWORKS LTD., Tel Aviv (IL)

(72) Inventors: Ofer Israeli, Tel Aviv (IL); Tom Kahana, Gan Yavne (IL); Tom Sela, Tel Aviv (IL); Yariv Hashai, Holon (IL)

(73) Assignee: ILLUSIVE NETWORKS LTD., Tel Aviv (IL)

( * ) Notice: Subject to any disclaimer, the term of this patent is extended or adjusted under 35 U.S.C. 154(b) by 87 days.

(21) Appl. No.: 15/633,782

(22) Filed: Jun. 27, 2017

(65) Prior Publication Data

US 2018/0374071 A1     Dec. 27, 2018

(51) Int. Cl.
*G06Q 20/20* (2012.01)
*G07G 1/00* (2006.01)
*G06Q 20/38* (2012.01)
*G06Q 20/40* (2012.01)
*G07F 7/08* (2006.01)
*G06Q 20/34* (2012.01)
*G06F 21/60* (2013.01)
*G06F 21/73* (2013.01)
*G06F 21/55* (2013.01)

(52) U.S. Cl.
CPC ......... *G06Q 20/206* (2013.01); *G06Q 20/204* (2013.01); *G06Q 20/389* (2013.01); *G06Q 20/4016* (2013.01); *G06Q 20/4093* (2013.01); *G07F 7/0873* (2013.01); *G07G 1/0009* (2013.01); *G06F 21/554* (2013.01); *G06F 21/60* (2013.01); *G06F 21/73* (2013.01); *G06Q 20/34* (2013.01)

(58) Field of Classification Search
CPC ..... G06Q 20/206; G06Q 20/34; G07G 1/0009
USPC .......................................................... 705/18
See application file for complete search history.

(56) References Cited

U.S. PATENT DOCUMENTS

| 8,549,643 | B1 * | 10/2013 | Shou | ..................... G06F 21/556 |
| | | | | 455/410 |
| 8,880,435 | B1 * | 11/2014 | Catlett | ................... G06Q 20/10 |
| | | | | 705/75 |
| 2006/0018466 | A1 * | 1/2006 | Adelstein | ............ H04L 63/1425 |
| | | | | 380/46 |

(Continued)

*Primary Examiner* — Florian M Zeender
*Assistant Examiner* — Nicole Elena Bruner
(74) *Attorney, Agent, or Firm* — Soquel Group I.P Ltd.

(57) ABSTRACT

A security system for point of sale (POS) terminals, including one or more POS processors for injecting decoy credit cards numbers into memories of corresponding one or more POS terminals, a secure database including entries of the decoy credit card numbers and, for each entry, a corresponding identifier of a specific POS terminal and a corresponding date & time, and a security manager receiving a notification of attempted use of a specific decoy credit card number, extracting the POS identifier and the date & time corresponding to the specific decoy credit card number from the database, identifying legitimate credit card numbers that were processed by the identified POS terminal during a time period including the date & time corresponding to the specific decoy credit card number, and alerting an authority that the legitimate credit card numbers may have been compromised.

11 Claims, 4 Drawing Sheets

(56) References Cited

U.S. PATENT DOCUMENTS

| | | | |
|---|---|---|---|
| 2010/0077483 A1* | 3/2010 | Stolfo | G06F 21/554 726/24 |
| 2012/0084866 A1* | 4/2012 | Stolfo | G06F 21/554 726/25 |
| 2013/0225075 A1* | 8/2013 | Schmid | G06Q 20/12 455/41.1 |
| 2016/0012222 A1* | 1/2016 | Stolfo | G06F 21/554 726/23 |
| 2017/0214701 A1* | 7/2017 | Hasan | H04L 63/1408 |
| 2017/0293906 A1* | 10/2017 | Komarov | G06Q 20/206 |
| 2018/0330121 A1* | 11/2018 | Margalit | H04L 63/1408 |
| 2018/0330122 A1* | 11/2018 | Margalit | H04L 63/1408 |

* cited by examiner

DEFENSE AGAINST CREDIT CARD THEFT FROM POINT-OF-SALE TERMINALS

FIELD OF THE INVENTION

The present invention relates to security of credit card information.

BACKGROUND OF THE INVENTION

A point-of-sale (POS) terminal is the device through which a retail transaction is made, i.e., the device at which a customer makes a payment to a merchant in exchange for goods or services. POS terminals generally include credit card readers, and store credit card information in their memories.

Credit card data is formatted in accordance with ISO/IEC 7813. The magnetic strip of a credit card has three data tracks. Payment cards use Track 1 and Track 2. The Track 1 standard is recorded at 210 bits per inch and contains 79 alphanumeric characters, as shown in TABLE I below.

TABLE I

Track 1 Standard

| Track Field | Track Value |
| --- | --- |
| SS | start sentinel |
| FC | format code (B or b) |
| PAN | primary account number (up to 19 digits) |
| FS | field separator |
| CN | cardholder name (up to 26 characters) |
| FS | field separator |
| ED | expiration date (YYMM) |
| SC | service code |
| DD | discretionary date (may include PIN) |
| ES | end sentinel |
| LRC | longitudinal redundancy check |

A PAN may be validated using the Luhn algorithm. Exemplary credit card data formatted in accordance with the 1 standard is

TABLE II

Exemplary Credit Card Data

| Track Field | Track Value |
| --- | --- |
| % | start |
| B | format code (B = bank) |
| 5874390765438112 | primary account number |
| ^ | separator |
| DOE | last name |
| / | name separator |
| JOHN | first name |
| ^ | separator |
| 11 | expiration year |
| 03 | expiration month |
| 101 | service code (3 digits) |
| 000000001000000003000000 | discretionary data |
| ? | end |

Credit cards are processed by POS terminals in three stages. At stage one, credit card information for a transaction is stored as plain text in random access memory (RAM) of a POS terminal. At stage two, data for the transaction is stored for a short period of time, until data is batch transmitted to a credit card company. Partial data is stored for a longer period of time for recording in a log file or database. The stage two data is encrypted. At stage three, data for transactions is batch transmitted over an internal local area network (LAN) or wide area network (WAN) and then over an external Internet. The transmitted data is encrypted.

POS terminals are susceptible to intrusion by attackers. The stage one data, which is not encrypted, is especially exposed. Attackers use "RAM scrapers" to extract credit card information from RAM of POS terminals. RAM scrapers operate by examining a list of processes running on a POS terminal and inspecting the POS memory for data that matches the format of credit card data, including an account number, expiration date, and other information stored in a card's magnetic strip. RAM scrapers are injected into running processes, and intercept sensitive data from memory before it is encrypted. An attackers' goal is to steal the data stored on the magnetic strip of credit cards, clone the cards, and make charges to the credit card accounts.

POS RAM scrapers generally use regular expression ("regex") matches to search for Track 1 and Track 2 credit card data from a process memory space in RAM of a POS terminal. An example of a regex for discovering Track 1 data is $$\char`\^\%([A\text{-}Z])([0\text{-}9]\{1,19\})\backslash\char`\^([\char`\^\backslash\char`\^]\{2,26\})\backslash\char`\^([0\text{-}9]\{4\}|\char`\^)$$
$$([0\text{-}9]\{3\}|\char`\^)([\char`\^\backslash\char`\^?]+)\backslash?\$$$

Depending on the complexity of the regex, a RAM scraper may also unintentionally capture garbage data from RAM in addition to legitimate card data, and POS RAM scrapers apply the Luhn algorithm to validate the card data prior to exfiltration.

SUMMARY

The present invention enables credit card companies and retailers to be alerted when a security breach occurs in a POS terminal, and to defend against credit card theft by inferring in advance which credit card numbers may have been compromised in the security breach, before actual attempted unlawful use of these credit card numbers occurs. The compromised credit card numbers are reported to a credit card company, which make take appropriate action such as cancelling the compromised credit card numbers, or tracking their use to gain knowledge about the culprit.

The present invention takes advantage of the fact that credit card data is only stored in POS RAM for a short time; namely, during the stage one processing described in the Background. The present invention injects decoy credit card numbers into memories of POS terminals, which appear to RAM scrapers as being legitimate credit card numbers. The decoy credit card numbers are changed often, on a regular basis, and their injection is recorded in a database. Specifically, for each decoy credit card number the database stores a POS terminal into which the decoy credit card number was injected, and the date & time of the injection. As such, detection of attempted use, anywhere in the world, of a decoy credit card number that was injected into a POS terminal may be used to infer the identity of the POS terminal that was breached by a RAM scraper, and the time of the breach. In turn, the identity of the POS terminal that was breached and of the time of the breach may be user to infer the legitimate credit card numbers that were available to the RAM scraper.

Attempted use of a decoy credit card number is evidence of a security breach by an attacker, and the specific decoy credit card number tracks the location and time of the breach. As such, legitimate credit card numbers that were available to the attacker may be inferred, and an alert may be sent to a credit card company to stop their use, before a criminal tries to use them.

There is thus provided in accordance with an embodiment of the present invention a security system for POS terminals, including one or more POS processors for injecting decoy credit cards numbers into memories of corresponding one or more POS terminals, a secure database including entries of the decoy credit card numbers and, for each entry, a corresponding identifier of a specific POS terminal and a corresponding date & time, and a security manager receiving a notification of attempted use of a specific decoy credit card number, extracting the POS identifier and the date & time corresponding to the specific decoy credit card number from said database, identifying legitimate credit card numbers that were processed by the identified POS terminal during a time period including the date & time corresponding to the specific decoy credit card number, and alerting an authority that the legitimate credit card numbers may have been compromised.

There is additionally provided in accordance with an embodiment of the present invention a security method for point of sale (POS) terminals, including injecting decoy credit cards numbers into memories of one or more POS terminals, storing entries of the decoy credit card numbers and, for each entry, a corresponding identifier of a specific POS terminal and a corresponding date & time, in a secure database, receiving a notification of attempted use of a specific decoy credit card number, extracting the POS identifier and the date & time corresponding to the specific decoy credit card number from the database, identifying legitimate credit card numbers that were processed by the identified POS terminal during a time period including the date & time corresponding to the specific decoy credit card number, and alerting an authority that the legitimate credit card numbers may have been compromised.

BRIEF DESCRIPTION OF THE DRAWINGS

The present invention will be more fully understood and appreciated from the following detailed description, taken in conjunction with the drawings in which.

For reference to the figures, the following index of elements and their numerals is provided. Similarly numbered elements represent elements of the same type, but they need not be identical elements.

| Table of elements in the figures | |
|---|---|
| Element | Description |
| 100 | POS terminal |
| 110 | POS processor |
| 120 | POS RAM |
| 130 | decoy credit card number generator |
| 150 | database |
| 200 | security manager |
| 210 | security processor |

| Table of elements in the figures | |
|---|---|
| Element | Description |
| 230 | decoy credit card number generator |
| 250 | database |
| 300 | credit card company/retailer computer |
| 330 | decoy credit card number generator |
| 350 | database |

Elements numbered in the 1000's are operations of flow charts.

DETAILED DESCRIPTION

Figure 1:
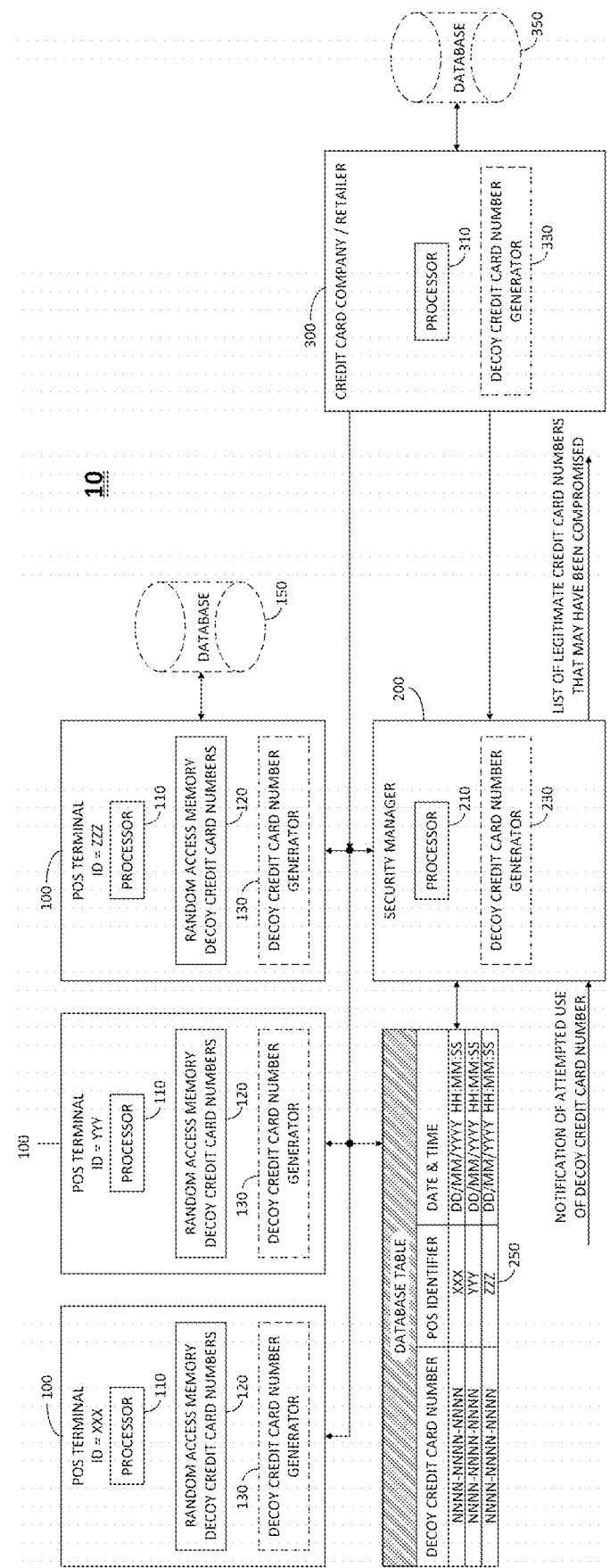
FIG. 1 is a simplified block diagram of a security system for POS terminals, in accordance with an embodiment of the present invention.

Reference is made to FIG. 1, which is a simplified block diagram of a security system 10 for POS terminals, in accordance with an embodiment of the present invention. FIG. 1 includes three primary components, namely, POS terminals 100, security manager computer 200, and credit card company or retailer computer 300. FIG. 1 shows three POS terminals 100 having respective identifiers denoted by XXX, YYY and ZZZ. A POS identifier as used herein may be a unique identifier for each POS, or alternatively an identifier of an organization, such as Walmart's, at which the POS terminal is used, or yet alternatively a geo-location identifier indicating where the POS terminal is located.

Each POS terminal 100 includes a processor 110, a random access memory (RAM) 120 and an optional decoy credit card number generator 130. RAM 120 stores legitimate credit card numbers, and also decoy credit card numbers that were injected in RAM 120 by processor 110 as part of security system 10.

Security manager computer 200 includes a processor 210 and an optional credit card number generator 230. As shown in FIG. 1, a database 250 stores, for each decoy credit card number, the identifier of a POS terminal in which the decoy credit card number was injected, and a date & time when the decoy credit card number was injected.

Credit card company or retailer computer 300 includes a processor 310 and an optional decoy credit card number generator 330. Optional databases 150 and 350 may be present at the site of POS terminals 100 and at the credit card company or retailer site, respectively. Such databases 150 and 350 are synchronized with database 250.

When an attacker breaches a POS terminal 100 and runs a RAM scraper, the RAM scraper will discover one or more decoy credit card numbers in addition to legitimate credit card numbers. When an attempt is made to use a decoy credit card number, an alert notification including the decoy credit card number is sent to security computer 200. When security computer 200 receives the alert notification, security computer 200 looks up the decoy credit card number in database 250 and extracts the POS identifier and the date & time associated with the decoy credit card number. Security manager computer 200 then identifies legitimate credit card numbers that were processed by the identified POS terminal during a time period including the identified date & time. Security manager 200 sends credit card company or retailer computer 300 a list identifying the identified legitimate credit card numbers as credit card numbers that may have been compromised, thereby enabling the credit card company or retailer to prevent fraud with the legitimate credit card numbers.

As shown in FIG. 1, generation of decoy credit card numbers may be performed by POS terminal 100, or by security manager computer 200, or by credit card company or retailer computer 300. If decoy credit card number generator 130 generates the decoy credit card numbers, then the generated decoy credit card numbers are transmitted to database 250 for storage, together with the POS identifier and the date & time of the generation. If decoy credit card number generator 230 or decoy credit card number generator 330 generates the decoy credit card numbers, then each decoy credit card number is transmitted to an appropriate POS terminal 100, and the decoy credit card number, the identifier of the POS terminal 100 and the date & time of transmission are transmitted to database 250 for storage.

In accordance with an embodiment of the present invention, the decoy credit card numbers injected into RAM of POS terminal 100 are changed on a regular basis. As such, when attempted use of a decoy credit card number is detected, the date & time stored in database 250 may be used to infer the date & time of the breach of the POS terminal.

Figure 2:
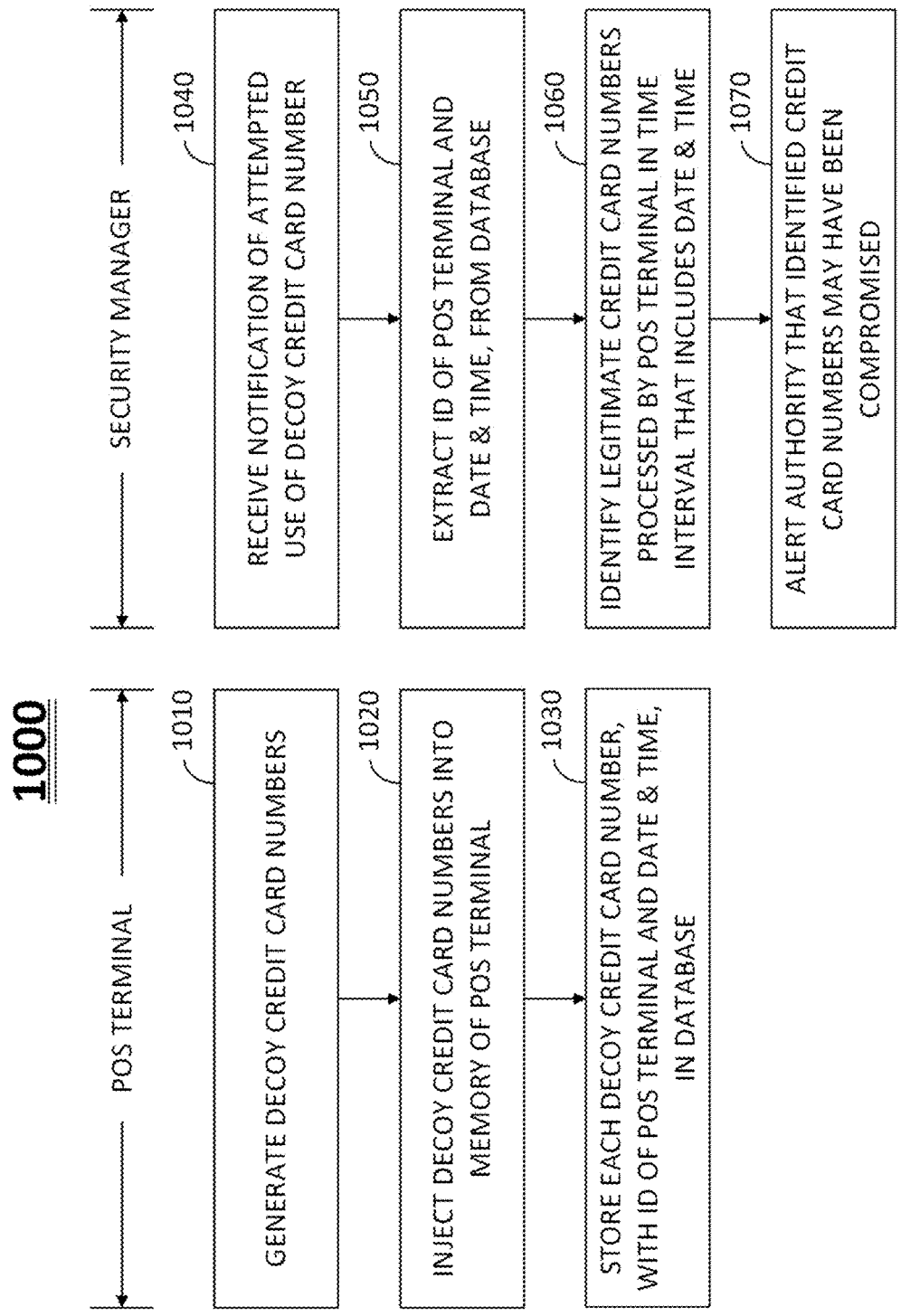
FIG. 2 is a simplified flowchart of a security method for POS terminals, in accordance with an embodiment of the present invention.

Reference is made to FIG. 2, which is simplified flowchart of a security method 1000 for POS terminals, in accordance with an embodiment of the present invention. The flowchart of FIG. 2 is divided into two columns. The left column shows operations performed by POS terminal 100, and the right column shows operations performed by security manager computer 200.

At operation 1010, decoy credit card generator 130 of POS terminal 100 generates decoy credit card numbers. The decoy credit card numbers are generated so as to satisfy the match required by the Luhn algorithm and, as such, are validated as being legitimate by RAM scrapers.

At operation 1020, processor 110 of POS terminal 100 injects the decoy credit card numbers into RAM 120 of POS terminal 100. The injected decoy credit card numbers are formatted in accordance with the ISO/IEC 7813 Track 1 or Track 2 standard.

At operation 1030, each decoy credit card number is stored in database 250, together with the ID of POS terminal 100 and the current date & time.

At operation 1040, security manager computer 200 receives notification of attempted use of a decoy credit card number. The notification may be sent to security manager computer 200 from a POS terminal 100. Specifically, when POS terminal 100 authorizes a credit card, it checks database 150 to see if the credit card number is a decoy credit card number. If so, a notification is transmitted to security manager 200. Alternatively, the notification may be sent to security manager computer 200 from credit card company or retailer computer 300. Specifically, when POS terminal 100 transmits a data batch to credit card company or retailer computer 300, credit card company or retailer computer 300 checks database 350 to see if one of the credit card numbers in the data batch is a decoy credit card number. If so, a notification is transmitted to security manager computer 200.

At operation 1050, security manager computer 200 consults database 250 and extracts the POS terminal ID and the date & time from database 250.

At operation 1060, security manager computer 200 identifies legitimate credit card numbers processed by POS terminal 100 in a time interval including the extracted data & time. Operation 1060 may be performed via two-way communication between server manager computer 200 and the identified POS terminal 100. Alternatively, operation 1060 may be performed via two-way communication between server manager computer 200 and the credit card company or retailer computer 300.

At operation 1070, security manager computer transmits an alert notification to credit card or retailer computer 300, with a list of the legitimate credit card numbers that may have been compromised.

In alternative embodiments of the present invention, operation 1010 may be performed by decoy credit card generator 230 of security manager computer 200, or by decoy credit card generator 330 of credit card company or retailer computer 300. Alternatively, operation 1010 may be performed by two of credit card generators 130, 230 and 330, or by all three of them. Similarly operation 1030 may be performed by POS terminal 100, by security manager computer 200, or by credit card company or retailer computer 300, or by two of these computers, or by all three of these computers. It is also anticipated by the instant disclosure that one or more computers distinct from POS terminal 100, security manager computer 200, and credit card company or retailer computer 300, may be responsible for generating decoy credit card numbers at operation 1010, and for storing the decoy credit card numbers and their corresponding POS terminal identifier and date & time in database 250 at operation 1030.

As mentioned hereinabove, operations 1010-1030 are repeated over time so as to change the decoy credit card information injected into POS terminal 100 on a regular basis.

Figure 3:
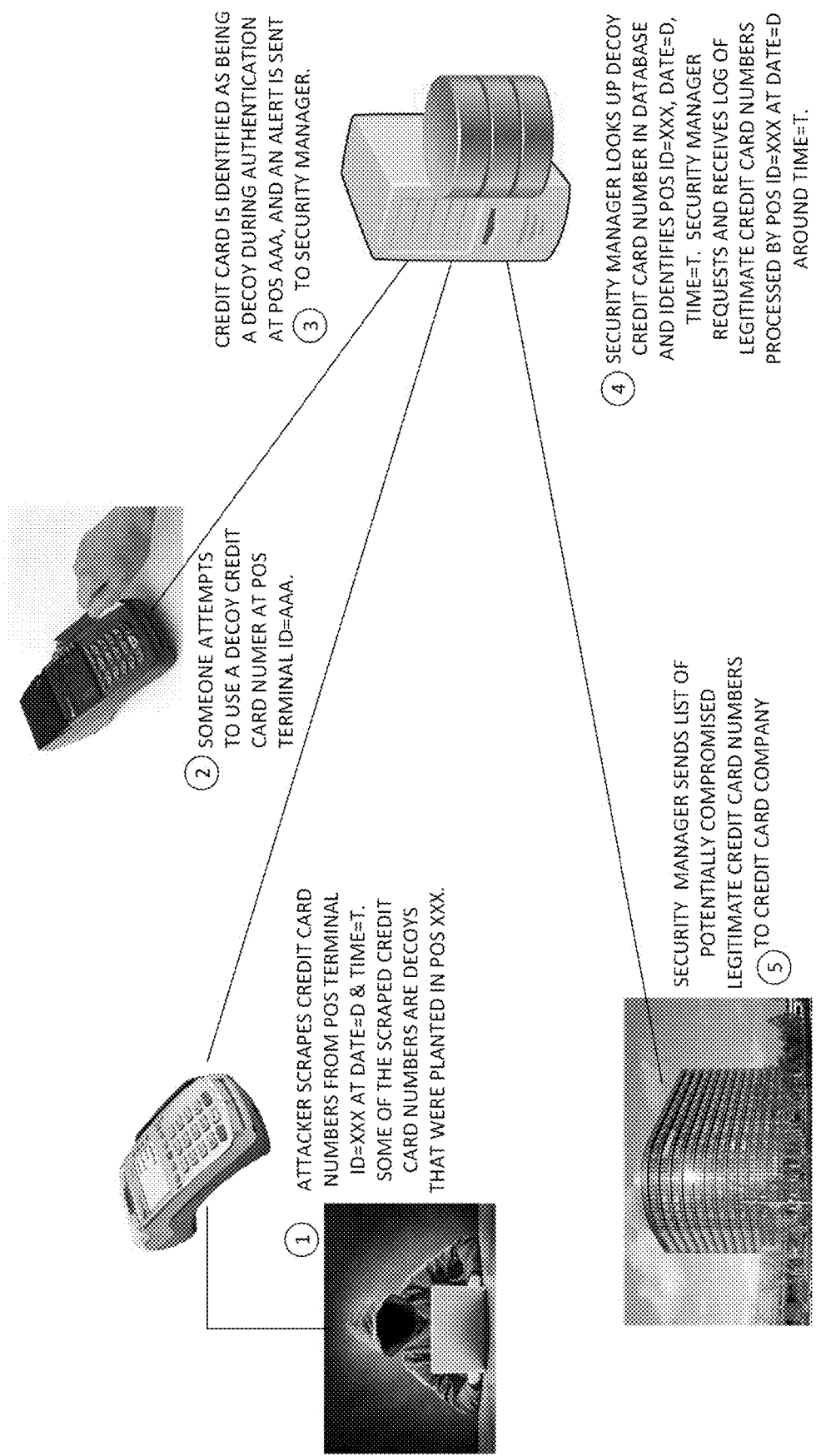
FIG. 3 is a simplified illustration of a use case of the security system of FIG. 1, in accordance with an embodiment of the present invention.

Reference is made to FIG. 3, which is a simplified illustration of a use case of the security system of FIG. 1, in accordance with an embodiment of the present invention. The use case shown in FIG. 3 occurs while decoy credit card credentials are repeatedly injected into RAM of a POS terminal 100 with ID=XXX. At stage 1, an attacker scrapes credit card numbers from RAM of POS terminal 100 at a date D and a time T. Some of the scraped credit card numbers are decoys and some of them are legitimate.

At stage 2, someone attempts to use one of the scraped decoy credit card numbers at a POS terminal 100 with ID=AAA. Generally, POS terminal AAA is different than POS terminal XXX.

At stage 3, the credit card number is identified as being a decoy credit card number, during authentication of a card at POS AAA. An alert is sent to security manager computer 200. The identification of the decoy credit card number may be performed by POS AAA, or by an authentication computer with which POS AAA communicates. The alert may be sent by POS AAA or by the authentication computer, or by such other computer related to the credit card company.

At stage 4, security manager computer 200 looks up the decoy credit card number sent my POS AAA in database 250, and identifies POS XXX as being the source of the decoy credit card number. Security manager computer 200 further identifies date D and time T as being the approximate time that the attacker breached POS terminal XXX at stage 1. The time of the breach may be inferred from D and T because the decoy credit card numbers within POS XXX are changed often on a regular basis. Security manager computer 200 then requests and receives logs of legitimate credit card numbers that were processed by POS XXX at around date D and time T. These legitimate credit card numbers are the ones that were potentially compromised during the breach of POS XXX by the attacker, since POS XXX only stores credit card numbers in its RAM for a short time. The logs may be obtained from POS XXX, which maintains a log of transactions, or from credit card company or retailer computer 300, which receives batch transaction data from POS XXX.

At stage 5, security manager computer 200 sends a list of potentially compromised legitimate credit card numbers to credit card company or retailer computer 300. The credit card company may then take appropriate action such as cancelling the compromised credit card numbers, or tracking their use in order to gain knowledge about the culprit.

It will be appreciated by those skilled in the art that the use case shown in FIG. 3 is but one of many different use cases for the system of FIG. 1. Thus, in a different use case, security manager computer 200 may be by-passed altogether, and communication may take place directly between the POS terminals XXX and AAA and the credit card company. In such a use case, the credit card company consults its own database 350 to determine the list of potentially compromised legitimate credit card numbers.

Figure 4:
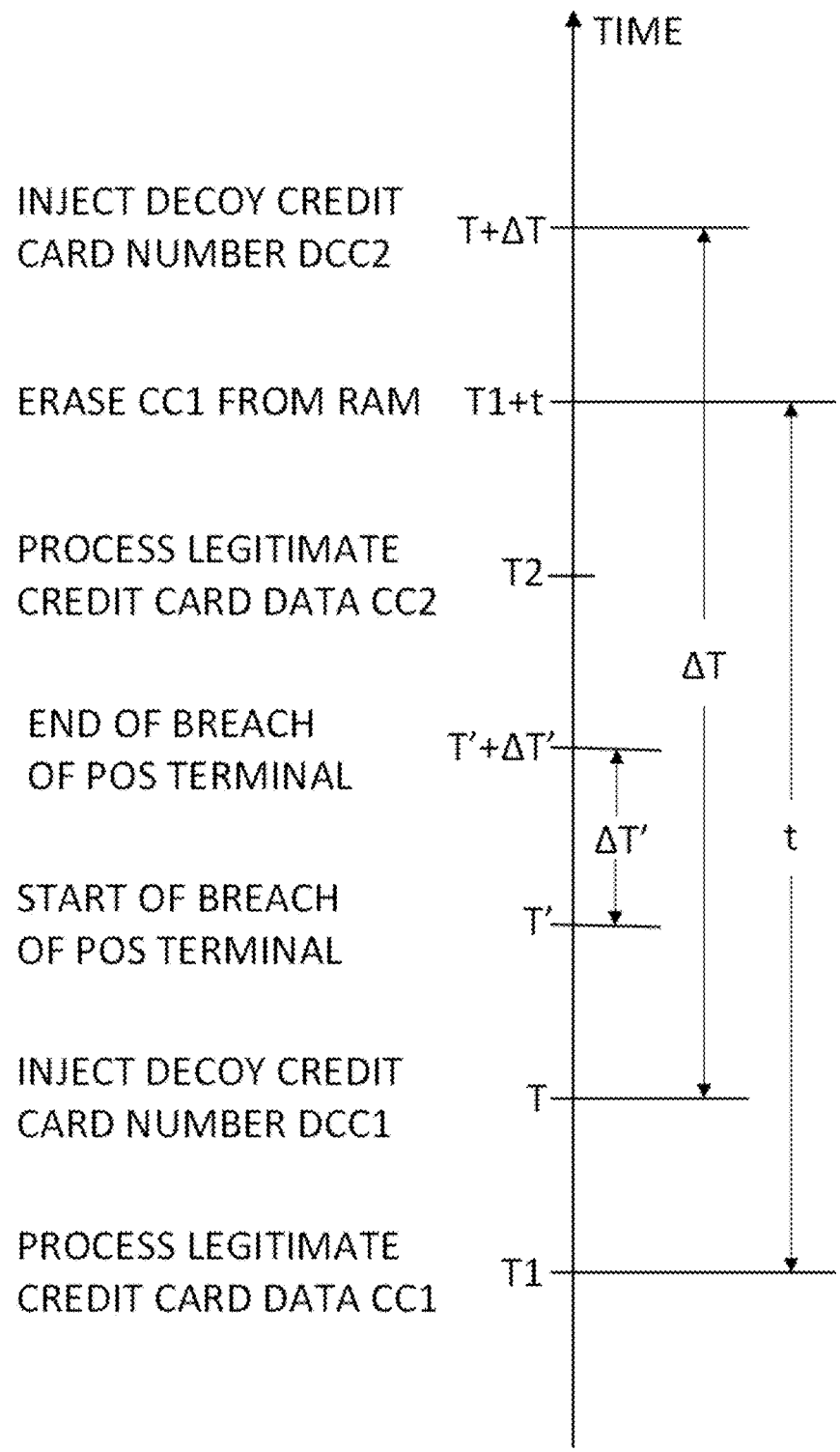
FIG. 4 is a simplified timeline of exemplary activity at a POS terminal, in accordance with an embodiment of the present invention.

Reference is made to FIG. 4, which is a simplified timeline of exemplary activity at a POS terminal 100, in accordance with an embodiment of the present invention. At time T1 POS terminal 100 processes a first credit card number, denoted CC1, and at time T2 POS terminal 100 processes a second credit card number, denoted CC2. At time T a decoy credit card number, denoted DCC1, is injected into POS RAM, and at time T+$\Delta$T a new decoy credit card number, denoted DCC2, is injected into POS RAM and the previous decoy credit card number, DCC1, is deleted from POS RAM. At time T' an attacker successfully beaches POS terminal 100, and between times T' and T'+$\Delta$T' the attacker scrapes credit card numbers from POS RAM.

If an attempt is made to use DCC1, anywhere in the world, then it can be inferred that POS terminal 100 was breached, and the time of breach, T', and the credit card numbers compromised during the breach may be inferred. Indeed, assume, as shown in FIG. 4, that the decoy credit card numbers are changed each time interval $\Delta$T, that the duration of the breach is from T' to T'+$\alpha$T', and that credit card data is only resident in POS RAM for a maximum time duration of t. Then (i) T' must be between T−$\Delta$T' and T+$\Delta$T, (ii) CC1 will have been compromised only if T−T1<t+$\Delta$T', and (iii) CC2 will have been compromised only if T2−T<$\Delta$T+$\Delta$T'. I.e., the maximal window of time in which credit card data may have been compromised is from T−t−$\Delta$T' to T+$\Delta$T+$\Delta$T'.

Although the above description relates to RAM scrapers, it will be appreciated by those skilled in the art that decoy credit card data may instead be injected into portions of POS terminal memory other than RAM 120. Thus, decoy credit card data may be additionally or alternatively injected into the operating system or into the file system of POS terminal 100.

Although the above description uses databases 150, 250 and 350, it will be appreciated by those skilled in the art that other forms of data stores may be used additionally or alternatively.

It will thus be appreciated by those skilled in the art that the subject invention enables credit card companies and retailers to defend against credit card theft, by inferring in advance which credit card numbers may have been compromised in a security breach before actual attempted unlawful use of these credit card numbers occurs.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

What is claimed is:

1. A security system for point of sale (POS) terminals, comprising:
    one or more POS processors injecting decoy credit card numbers into memories of corresponding one or more POS terminals, comprising deleting previous decoy credit card numbers from the POS memories and injecting new decoy credit card numbers into the POS memories at regular intervals of time spaced apart by a time difference $\Delta$T;
    a secure database comprising entries of the decoy credit card numbers and, for each decoy credit card number entry, a corresponding identifier of a specific POS terminal and a corresponding date & time at which the decoy credit card number was injected into the memory of the specific POS terminal; and
    a security manager receiving a notification of attempted use of a specific decoy credit card number, extracting the POS identifier from said secure database to identify a POS terminal, extracting the date & time, T, that the specific decoy credit card number was injected into the memory of the identified POS terminal from said secure database, identifying legitimate credit card numbers that were processed by the identified POS terminal during a window of time that includes the time interval between T−t and T+$\Delta$T, where t is the maximum duration that legitimate credit card numbers remain in POS memory unencrypted, and alerting an authority that the legitimate credit card numbers may have been compromised.

2. The system of claim 1 wherein said security manager generates the decoy credit card numbers, transmits the generated decoy credit card numbers to said one or more POS processors, and transmits the generated decoy credit card numbers, the POS identifiers and the dates & times at which the decoy credit numbers were injected into the POS memory to said secure database.

3. The system of claim 2 wherein said security manager generates new decoy credit card numbers at regular intervals of time, transmits the new decoy credit card numbers to said one or more POS processors, and transmits the new decoy credit card numbers, the POS identifiers and the dates & times at which the decoy credit numbers were injected into the POS memory to said secure database, and wherein said one or more processors delete the previous decoy credit card numbers from the POS memories and inject the new decoy credit card numbers into the POS memories.

4. The system of claim 1 wherein said one or more POS processors generate the decoy credit card numbers, and transmit the generated decoy credit card numbers, the POS identifier and the dates & times at which the decoy credit numbers were injected into the POS memory to said secure database together.

5. The system of claim 4 wherein said one or more POS processors generate new decoy credit card numbers at regular intervals of time, transmit the new decoy credit card numbers, the POS identifiers and the dates & times at which the decoy credit numbers were injected into the POS memory to said secure database, delete the previous decoy credit card numbers from the POS memories, and inject the new decoy credit card numbers into the POS memories.

6. The system of claim 1 further comprising a credit card company computer, wherein said credit card company computer generates the decoy credit card numbers, transmits the generated decoy credit card numbers to said one or more POS processors, and transmits the generated decoy credit card numbers, the POS identifiers and the dates & times at which the decoy credit numbers were injected into the POS memory to said secure database, and wherein said security manager sends an alert to said credit card company computer that the legitimate credit card numbers may have been compromised.

7. The system of claim 6 wherein said credit card company computer generates new decoy credit card numbers at regular intervals of time, transmits the new decoy credit card numbers to sail one or more POS processors, and transmits the new decoy credit card numbers, the POS identifiers and the dates & times at which the decoy credit numbers were injected into the POS memory to said secure database, and wherein said one or more processors delete the previous decoy credit card numbers from the POS memories and inject the new decoy credit card numbers into the POS memories.

8. A security method for point of sale (POS) terminals, comprising:
   Injecting, by a processor, decoy credit card numbers into memories of one or more POS terminals, comprising, at regular intervals of time:
      deleting, by the processor, previous decoy credit card numbers from the POS memories; and
      injecting, by the processor, new decoy credit card numbers into the POS memories at regular intervals of time spaced apart by a time difference $\Delta T$;
   storing, by the processor, entries of the decoy credit card numbers and, for each decoy credit card number entry, a corresponding identifier of a specific POS terminal and a corresponding date & time at which the decoy credit card number was injected into the memory of the specific POS terminal, in a secure database;
   receiving, by the processor, a notification of attempted use of a specific decoy credit card number;
   extracting, by the processor, the POS identifier from the secure database to identify a POS terminal;
   further extracting, by the processor, the date & time, T, that the specific decoy credit card number was injected into the memory of the identified POS terminal from the secure database;
   identifying, by the processor, legitimate credit card numbers that were processed by the identified POS terminal during a window of time including the time interval between $T-t$ and $T+\Delta T$ where t is the maximum duration that legitimate credit card numbers remain in POS memory unencrypted; and
   alerting, by the processor, an authority that the legitimate credit card numbers may have been compromised.

9. The method of claim 8 further comprising generating the decoy credit card numbers and transmitting the generated decoy credit card numbers to the secure database for storage.

10. The method of claim 8 further comprising generating the decoy credit card numbers and transmitting the generated decoy credit card numbers to the one or more POS terminals for injection in the terminal memories.

11. The method of claim 8 further comprising:
   generating new decoy credit card numbers at regular intervals of time;
   transmitting the new decoy credit card numbers to the POS terminals;
   transmitting the new decoy credit card numbers, the POS identifiers and the dates & times at which the decoy credit numbers were injected into the POS memory to the secure database;
   deleting the previous decoy credit card numbers from the POS memories; and
   injecting the new decoy credit card numbers into the POS memories.

* * * * *